United States Patent
Salato

(10) Patent No.: US 8,587,269 B2
(45) Date of Patent: Nov. 19, 2013

(54) CYCLE BY CYCLE SYNCHRONOUS BUCK CONVERTER CONTROL BASED ON EXTERNAL CLOCK

(75) Inventor: Maurizio Salato, El Segundo, CA (US)

(73) Assignee: International Rectifier Corporation, El Segundo, CA (US)

( * ) Notice: Subject to any disclaimer, the term of this patent is extended or adjusted under 35 U.S.C. 154(b) by 515 days.

(21) Appl. No.: 11/876,088

(22) Filed: Oct. 22, 2007

(65) Prior Publication Data

US 2008/0100278 A1 May 1, 2008

Related U.S. Application Data

(60) Provisional application No. 60/863,235, filed on Oct. 27, 2006.

(51) Int. Cl.
*G05F 1/575* (2006.01)
(52) U.S. Cl.
USPC .............. 323/271; 323/282; 323/288; 363/15
(58) Field of Classification Search
USPC ............. 323/271, 282, 283, 284, 288; 363/15
See application file for complete search history.

(56) References Cited

U.S. PATENT DOCUMENTS

| | | | | |
|---|---|---|---|---|
| 5,773,966 A * | 6/1998 | Steigerwald | ................... | 323/284 |
| 5,929,618 A * | 7/1999 | Boylan et al. | ................. | 323/282 |
| 6,147,478 A * | 11/2000 | Skelton et al. | ................. | 323/288 |
| 6,218,821 B1 * | 4/2001 | Bisbee | ........................ | 323/299 |
| 6,307,361 B1 * | 10/2001 | Yaakov et al. | ................. | 323/288 |
| 6,593,725 B1 * | 7/2003 | Gallagher et al. | ............. | 323/284 |
| 6,788,038 B1 * | 9/2004 | Bell et al. | ........................ | 323/284 |
| 7,075,277 B2 * | 7/2006 | Ishii et al. | ........................ | 323/259 |
| 7,149,097 B1 * | 12/2006 | Shteynberg et al. | ............ | 363/16 |
| 7,208,921 B2 * | 4/2007 | Walters | ........................ | 323/222 |
| 7,239,257 B1 * | 7/2007 | Alexander et al. | ............. | 341/138 |
| 7,294,993 B2 * | 11/2007 | Clavette et al. | ................ | 323/282 |
| 7,310,048 B2 * | 12/2007 | Balakrishnan et al. | ........ | 340/664 |
| 7,504,810 B1 * | 3/2009 | Tagare | .......................... | 323/282 |
| 2003/0156433 A1 * | 8/2003 | Gong et al. | ..................... | 363/18 |
| 2003/0223255 A1 * | 12/2003 | Ben-Yaakov et al. | ........... | 363/89 |
| 2005/0243894 A1 * | 11/2005 | Chen et al. | ..................... | 375/139 |
| 2006/0125450 A1 * | 6/2006 | Tabaian et al. | ................. | 323/222 |
| 2006/0290334 A1 * | 12/2006 | Bazes | ........................... | 323/282 |
| 2007/0114986 A1 * | 5/2007 | Yoshii | ........................... | 323/288 |
| 2007/0210772 A1 * | 9/2007 | Sawtell | .......................... | 323/282 |
| 2008/0094861 A1 * | 4/2008 | Wang | ........................... | 363/21.11 |

* cited by examiner

*Primary Examiner* — Adolf Berhane
*Assistant Examiner* — Fred E Finch, III
(74) *Attorney, Agent, or Firm* — Farjami & Farjami LLP

(57) ABSTRACT

A DC-DC voltage converter having a switching stage including high- and low-side switches connected in series at a switched node across a DC voltage bus; a control circuit; and a feedback loop connected between an output of the switching stage and an input of the control circuit, the control circuit having a clock signal input and including an error processing circuit coupled to the input for detecting an output of the feedback loop, the control circuit turning OFF the low-side switch and turning ON the high-side switch when the clock signal is detected. The control circuit operates in a cycle-by-cycle operation generating PWM modulation synchronous to the external clock source.

10 Claims, 10 Drawing Sheets

CYCLE BY CYCLE SYNCHRONOUS BUCK CONVERTER CONTROL BASED ON EXTERNAL CLOCK

CROSS-REFERENCE TO RELATED APPLICATION

This application is based on and claims priority to U.S. Provisional Patent Application Ser. No. 60/863,235, filed on Oct. 27, 2006 and entitled CYCLE BY CYCLE SYNCHRONOUS BUCK CONVERTER CONTROL BASED ON EXTERNAL CLOCK, the entire disclosure of which is hereby incorporated by reference.

BACKGROUND OF THE INVENTION

The present invention relates to DC-DC converters and more particularly to a circuit to step-down output voltage to a lower voltage and power level.

Isolated DC-DC converters, whether part of a complete AC-DC system or just pure DC-DC system, often require several output voltages at different power levels. These output voltages are normally obtained through multiplication of a transformer's secondary windings for each output at higher power level, e.g., 30 W and up, while simple buck converters are often used for step-down stages to a lower voltage and lower power level, generally less than 30 W, from one of the output voltages.

FIG. 1 illustrates a DC-DC converter 10 having a primary stage 12 having a DC bus as input and an output connected to a primary coil $L_P$ of a transformer 14. The transformer includes first and second secondary coils $L_{S1}$ and $L_{S2}$ series connected at a node. The first and second secondary coils LS1 and $L_{S2}$ are connected to first and second output rectification circuits 16 and 18. Each rectification circuit 16 and 18 has an Output 1 and 2, respectively including a capacitor Cout1 and Cout2, respectively.

The DC-DC converter 10 further includes a synch buck control circuit 20 for controlling a third switching stage 22 with Output 3. The switching stage 22 includes high- and low-side switches M1 and M2 connected in series at a switching node. The high-side switch M1 is further connected to the output of the output rectification circuit 18 and the low-side switch M2 is farther connected to ground. Additionally, a first terminal of an inductor L1 is connected to the switched node VS and its second terminal, in a local feed back loop, to the synch buck control circuit 20. Further, a capacitor Cout3 is connected between the second terminal of the inductor L1 and ground.

SUMMARY OF THE INVENTION

It is an object of the present invention to provide step-down stages that are simple, compact, and are implemented in less space and at lower cost than a supplemental secondary winding and output rectification system.

It is another object of the present invention to provide step-down stages that are autonomous and include a high power outputs feedback converter on the primary side while the step-down stages close their loops entirely on the secondary side.

Provided is a DC-DC voltage converter having a switching stage including high and low-side switches connected in series at a switched node across a DC voltage bus; a control circuit; and a feedback loop connected between an output of the switching stage and an input of the control circuit, the control circuit having a clock signal input and including an error processing circuit coupled to the input for detecting an output of the feedback loop, the control circuit turning OFF the low-side switch and turning ON the high-side switch when the clock signal is detected. The control circuit operates in a cycle by cycle operation generating PWM modulation synchronous to the external clock source.

Other features and advantages of the present invention will become apparent from the following description of the invention that refers to the accompanying drawings.

DETAILED DESCRIPTION OF EMBODIMENTS OF THE INVENTION

The present invention offers a simple, cost effective, externally synchronizable buck converter that can operate independent from the primary side. The inventive converter dispenses with amplifiers and oscillators and therefore reduces the area of the control IC.

The converter control of the invention operates synchronous with the main converter's secondary coil, therefore providing EMI spectrum reduction and more effective usage of capacitors, i.e., output capacitors for the main converter and input capacitors for the synchronous buck converter.

The inventive circuit can be easily coupled with controller products that are clocked by the operations of the secondary side, for example, a family of SmartRectifier™ ICs manufactured and sold by the International Rectifier Corporation.

Figure 1:
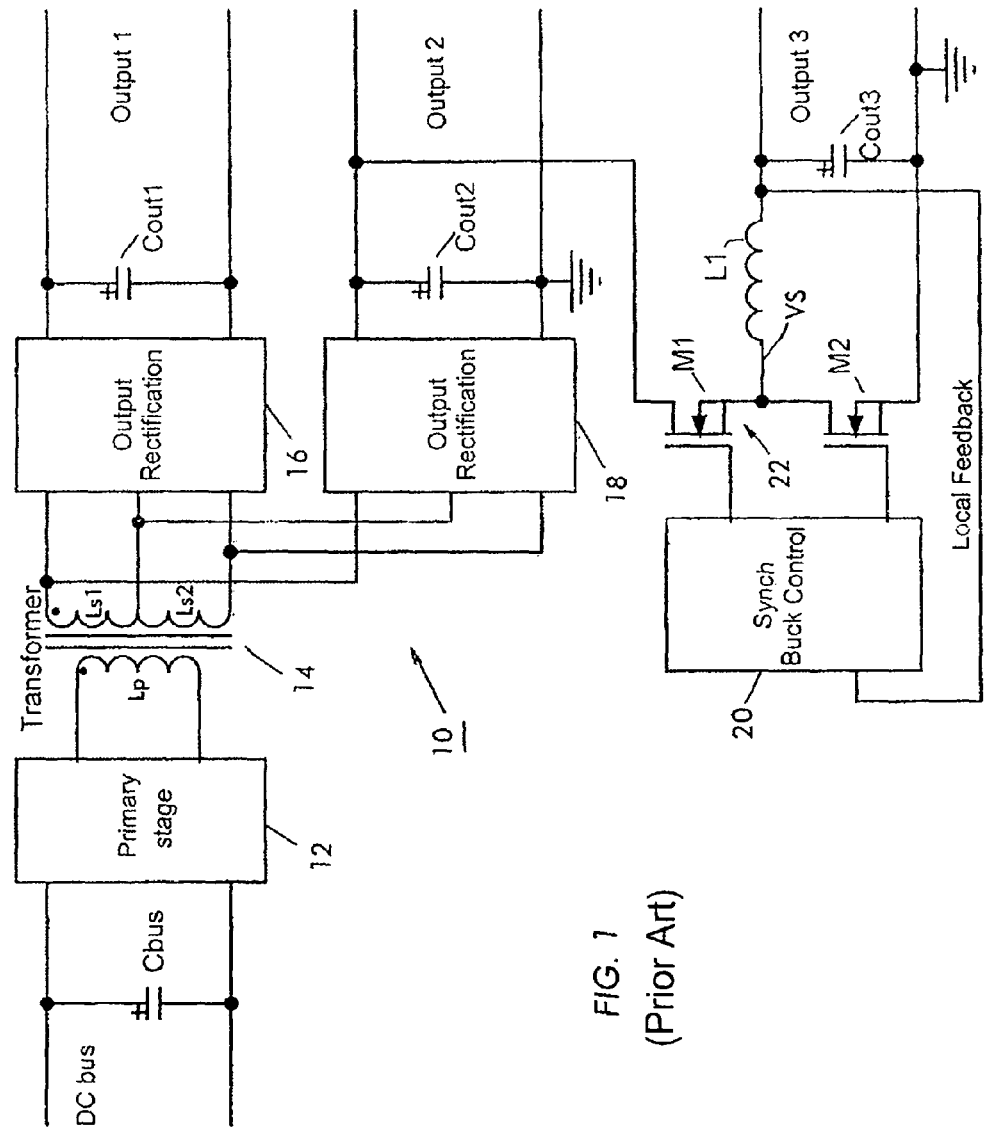
FIG. 1 is a diagram of a known isolated DC-DC stage with multiple outputs.
Figure 2:
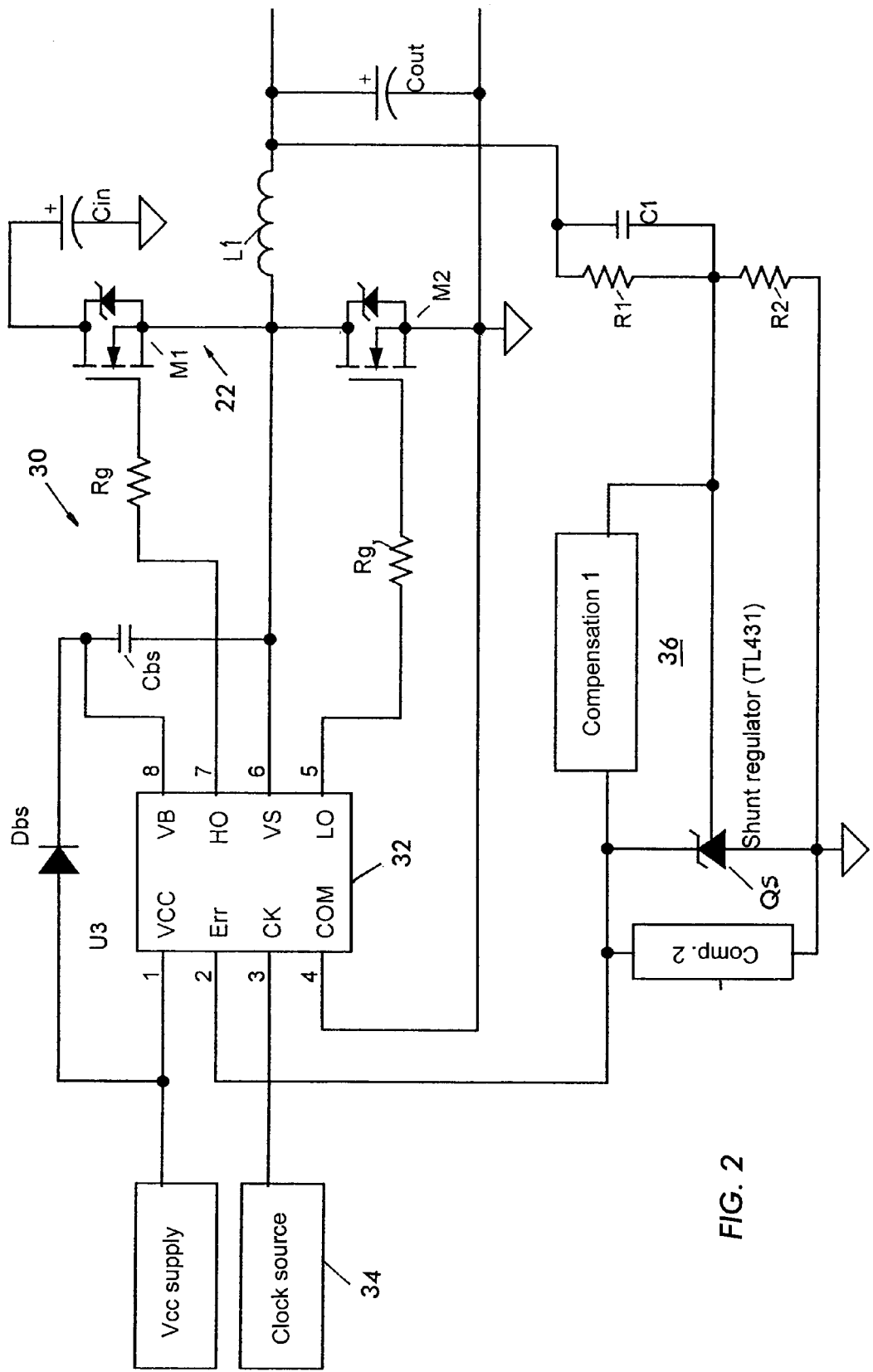
FIG. 2 is a diagram of a step-down converter circuit of the present invention controlled by a controller.

As illustrated in FIG. 2, the present invention realizes a step-down converter 30 control by integrating a control circuit 32 that utilizes any available secondary clock source 34, e.g., control circuit outputs, auxiliary windings, power windings, etc.; closing the buck converter feedback loop through a standard shunt regulator 36 acting as an error amplifier; and implementing a new concept of PWM modulation based on the external clock and the obtained error signal.

As shown, the control circuit 32 controls the high- and low-side switches M1 and M2 of the switching stage. The control circuit 32 has HO and LO pins to control the high- and low-side switches; a VS pin to receive voltage sense from the switched node VS; a VB pin to receive floating supply boot strap voltage; a COM pin connected to the common; a CK pin to receive a clock; a VCC pin to receive a voltage supply; and an Err pin to receive a feedback signal from the shunt regulator 36. As an input, the control circuit 32 requires only the voltage supply at the VCC pin and the clock signal at the CK pin.

The shunt regulator 36 provides a reliable voltage reference and acts as error amplifier through dedicated compensation networks. The shunt regulator 36 includes first and second compensation circuits, a shunt regulator break-over device QS, first and second series connected resistors R1 and R2 and a capacitor C1. The resistor R1 is also parallel connected to the capacitor C1 and in series to the resistor R2. A second terminal of the resistor R2 is grounded. A second terminal of the resistor R1 is connected to an input terminal of the capacitor Cout. The first and second compensation circuits and a cathode of QS are connected to Err pin of the control circuit 32. The second compensation circuit and the anode of QS are connected to the ground. The first compensation circuit and a control electrode of QS are connected to a node between the resistors R1 and R2.

The invention will now be described using FIG. 3, which shows the step-down converter 30 using an exemplary embodiment of the control circuit 32. The control is achieved in accordance with the following steps. The clock signal from the clock source 34 is detected at CK pin, i.e., using the falling, or rising edges of the signal. The detected signal will set a flip-flop circuit 40 to signal a bridge logic circuit 42 to turn OFF the low-side switch M2 and turn ON the high-side switch M1.

An error processing circuit 44 detects the voltage and current received from the feedback loop. The Err input presents a resistive behavior, and thus the shunt regulator 36 will drain a current, which is inversely proportional to the output voltage error. A mirrored current will start charging an internal capacitor C2. As the capacitor C2 charges, its voltage is compared by a comparator 46 with the voltage at Err pin. When the voltage on the internal capacitor C2 reaches the larger of the voltage at Err pin and an internal reference voltage, the dedicated comparator 46 will reset the flip-flop circuit 40 to signal the bridge logic circuit 42 to turn OFF the high-side switch M1 and to turn ON the low-side switch M2 for the duration of time it takes a switch Q1, triggered by the flip-flop circuit 40, to discharge the ramp capacitor C2. The above is performed in a cycle by cycle operation causing PWM modulation to be generated, synchronous to the external clock source 34.

Figure 3:
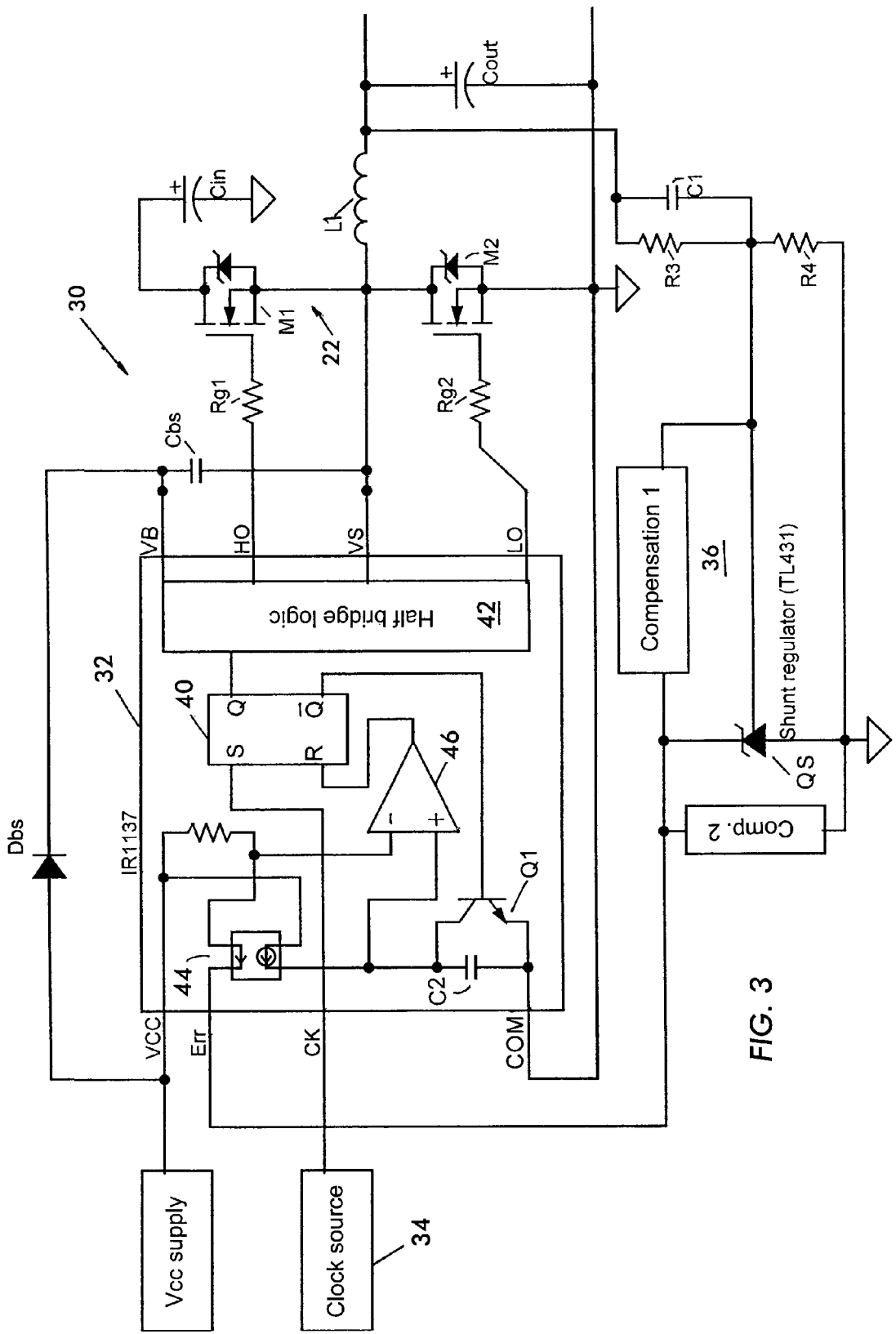
FIG. 3 is a diagram of a controller circuit used to control the step down converter of the present invention.
Figure 4:
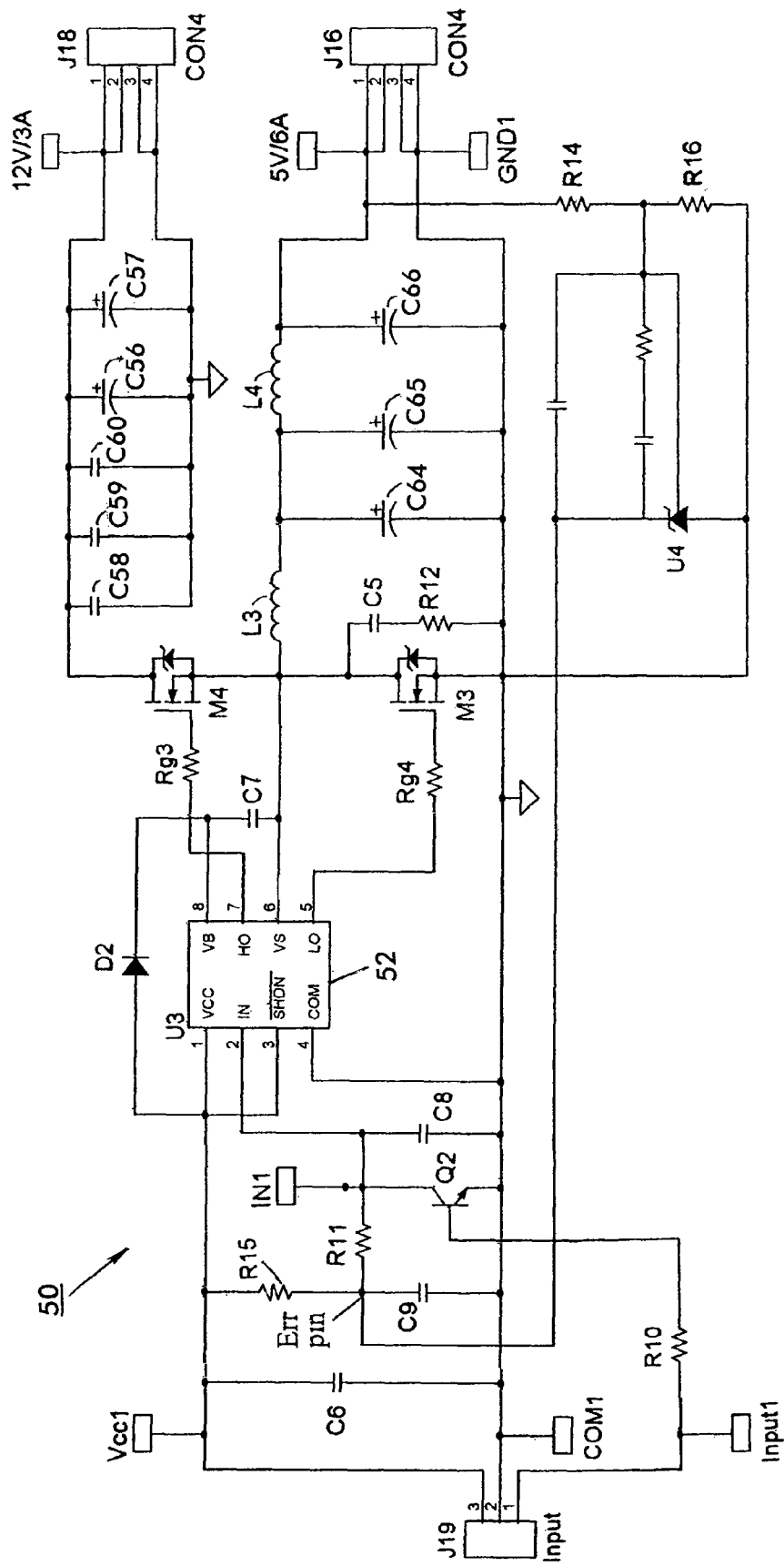
FIG. 4 is a diagram of an experimental circuit realized to verify the present invention, using a known controller circuit.
Figure 5A:
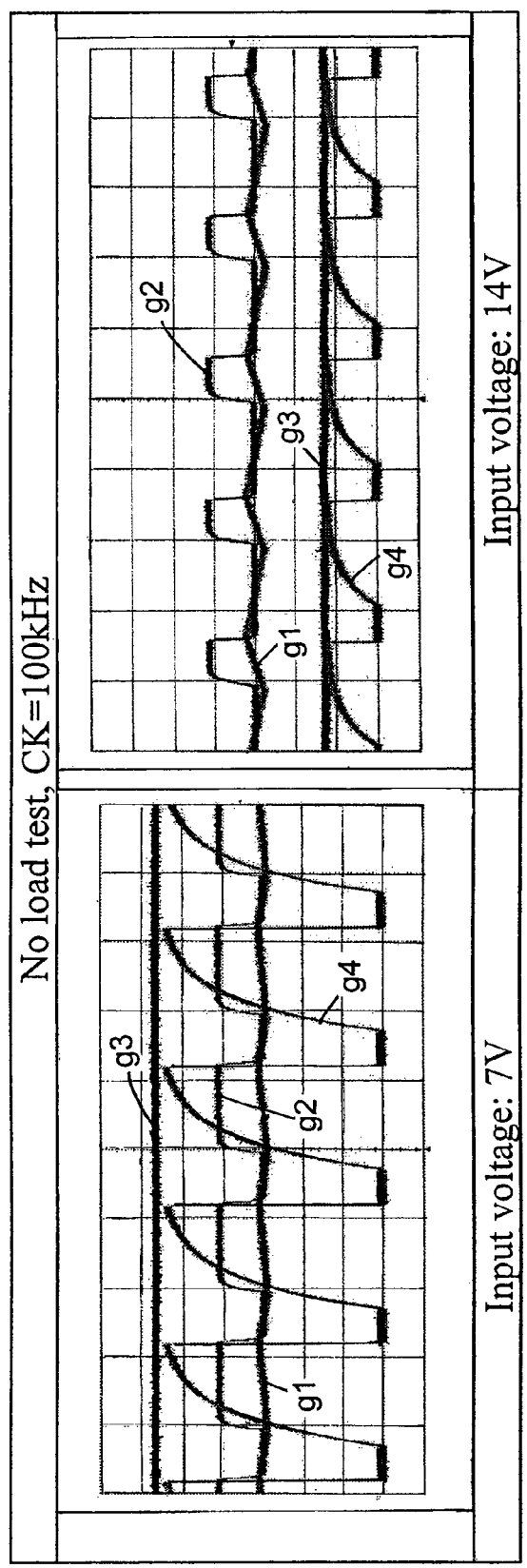
FIGS. 5A-5F are graphs showing relevant measurements of the circuit of FIG. 4.
Figure 5B:
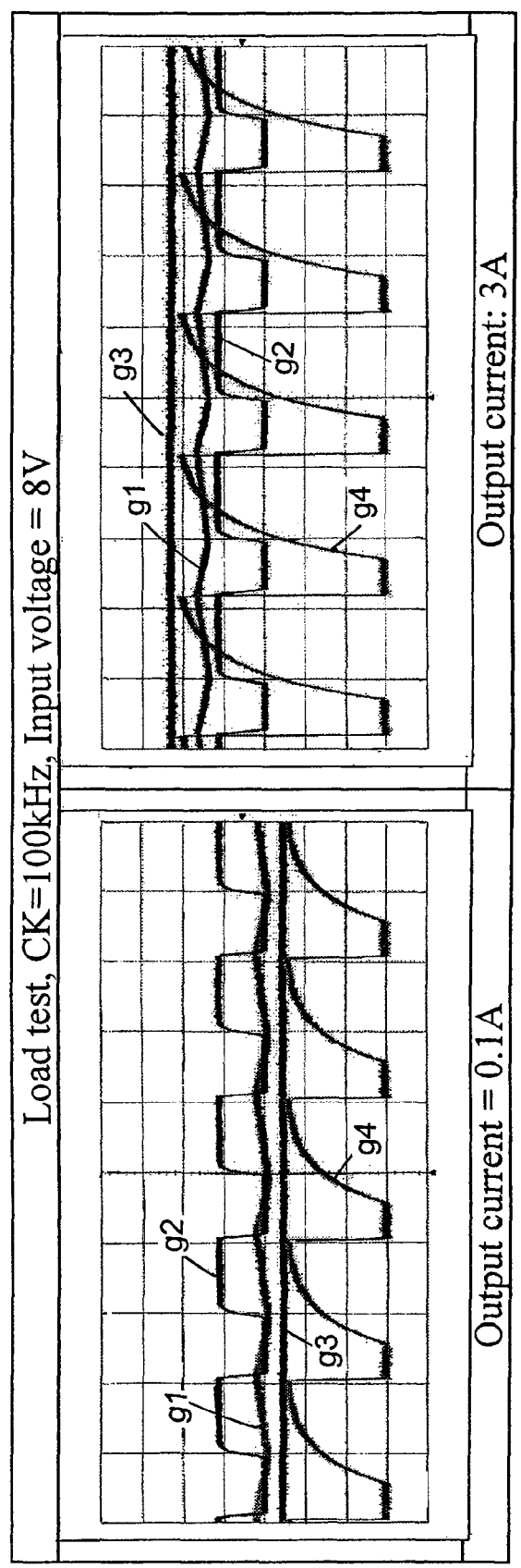
Figure 5C:
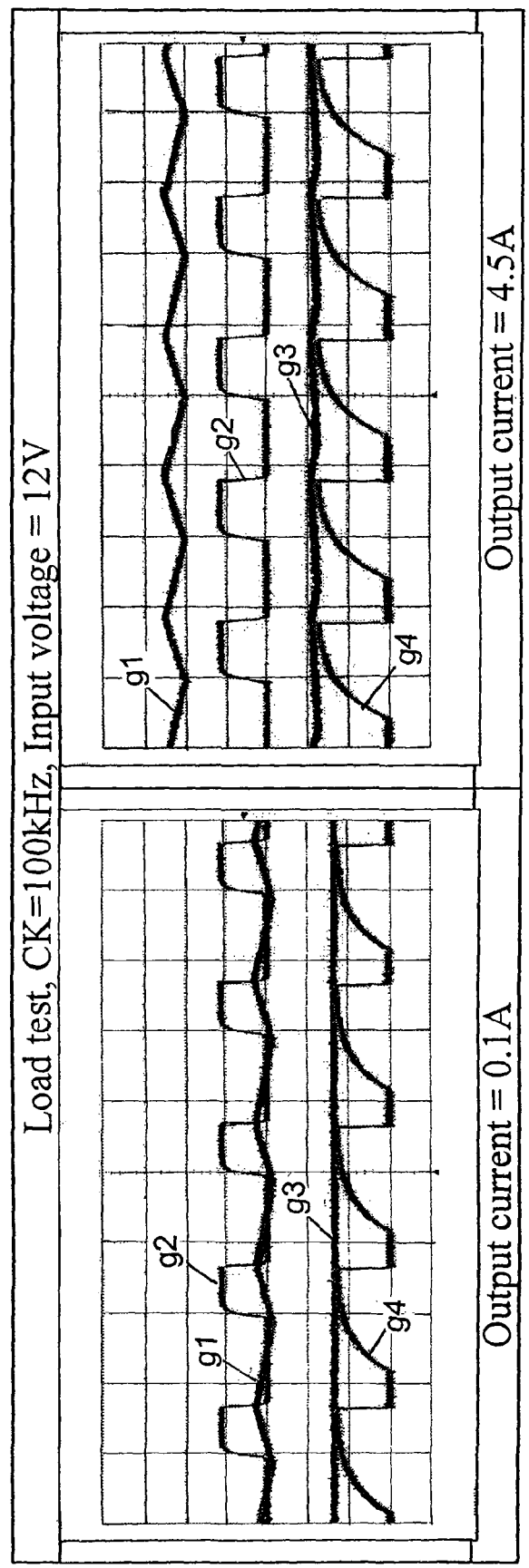
Figure 5D:
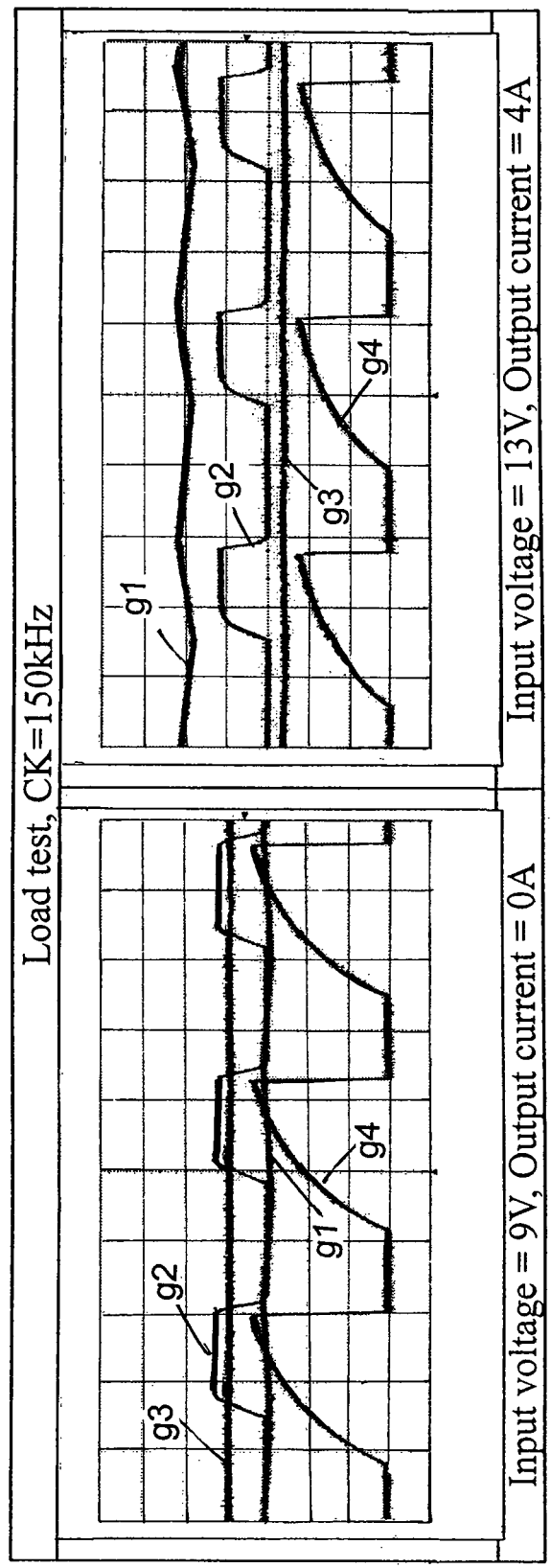
Figure 5E:
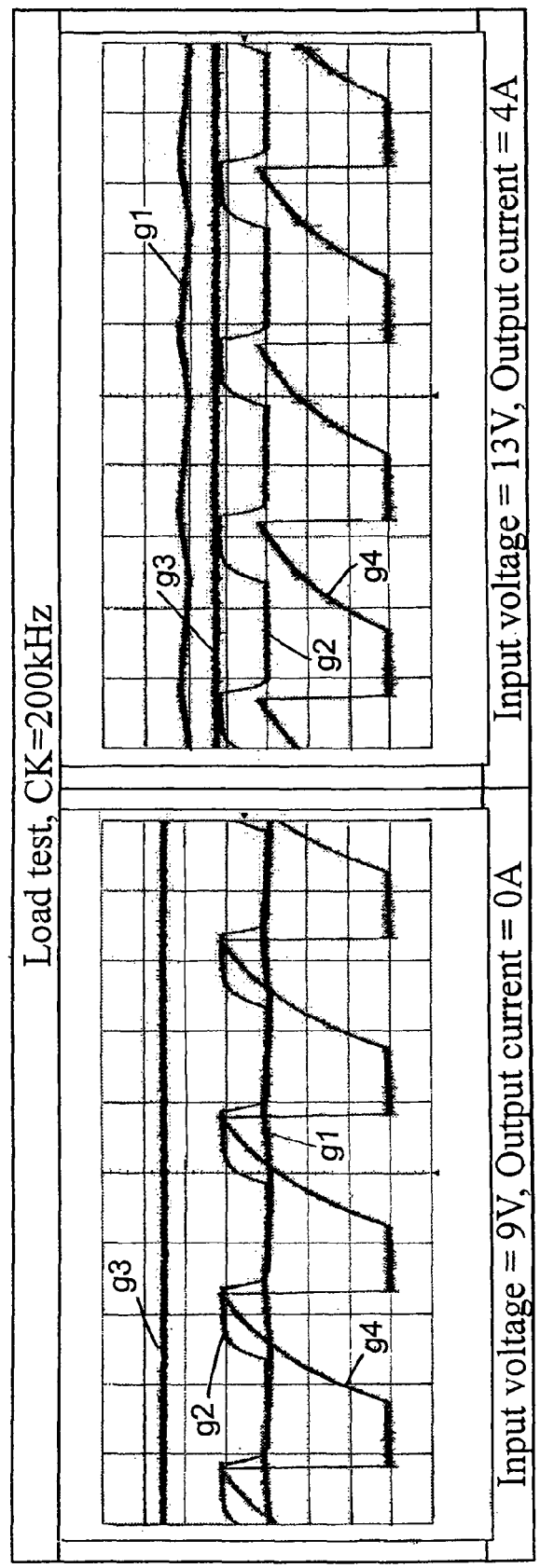
Figure 5F:
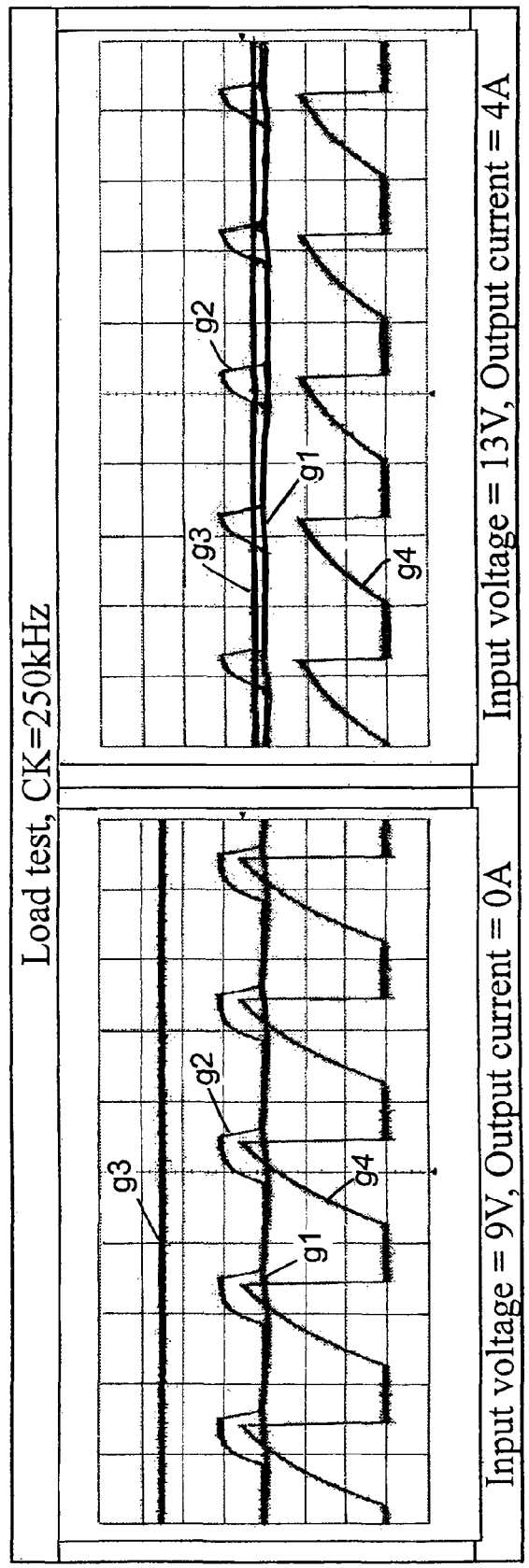

FIG. 4 shows a more detailed implementation of the circuit of FIGS. 2 and 3 using a standard controller circuit IRS2004, manufactured and sold by International Rectifier Corporation, and external components in a converter circuit 50 as illustrated in FIG. 4. The converter circuit 50 has a 10-14V input, 5V, 30 W output controlled by a synchronous buck converter control circuit 52. The control circuit 52 is connected to a high-side switch M4 via a resistor Rg3 and to the low-side switch M3 via a resistor Rg4. The switches M4 and M3 are coupled to form a switching stage having a switching node. The high-side switch is connected to a circuit of parallel coupled capacitors C56, C57, C58, C59, and C60. Three capacitors C58, C59, and C60 are 1 uF/25V and the capacitors C56 and C57 are 500 uF/25V.

The low-side switch M3 is connected to a circuit that include two series coupled inductors L3 and L4 connected to the switched node, capacitors C64, C65 and C66 that are 100 uF/16 v and a capacitor C5 resistor R12 combination that is parallel connected to the switch M3.

The driver IC 52 includes VS, VB, HO, LO, VCC, and COM pins as discussed above, additionally it includes IN connected to an external clock source (CK), and SHDN inverse pin tied to VCC. The node between R15 and C9 acts as Err pin, and switch Q2 is a reset switch across a ramp capacitor C8. R11 is a roughly approximated current generator. The comparator and bridge logic circuits are included in the driver IC 52. A fixed or adaptive dead-time logic needs to be implemented at the half bridge driving level.

FIGS. 5A-5F illustrate the waveforms obtained by the above-discussed circuit 50 of FIG. 4. In the Figures, g1 indicates the inductor current, g2 indicates voltage Vgs of the high side switch, g3 indicates voltage at Err pin i.e., the node at the register R15 and the capacitor C9, and g4 indicates ramp capacitor voltage at IN pin.

Tests of the circuit of FIG. 4 prove the concept of the invention. The following Case 1 and Case 2 tables show the regulation characteristics and step down voltage outputs for voltage inputs between 7V and 13V:

| CASE 1: CK = 100 kHz | | | | | | | |
|---|---|---|---|---|---|---|---|
| No load test | | | Vin = 8 V | Vin = 9 V | Vin = 10 V | Vin = 11 V | Vin = 12 V |
| Vin [V] | Vout [A] | Iout [A] | Vout [V] | Vout [V] | Vout [V] | Vout [V] | Vout [V] |
| 7 | 4.99 | 0.1 | 4.99 | 4.997 | 4.999 | 5 | 5.002 |
| 8 | 4.99 | 0.5 | 4.98 | 4.992 | 4.996 | 4.998 | 5 |
| 9 | 4.99 | 1 | 4.98 | 4.991 | 4.996 | 4.998 | 4.997 |
| 10 | 4.99 | 1.5 | 4.97 | 4.99 | 4.995 | 4.997 | 4.996 |
| 11 | 5.001 | 2 | 4.97 | 4.989 | 4.994 | 4.996 | 4.995 |
| 12 | 5.002 | 2.5 | 4.94 | 4.986 | 4.992 | 4.995 | 4.994 |
| 13 | 5.002 | 3 | 4.9 | 4.983 | 4.989 | 4.993 | 4.992 |
| | | 3.5 | | 4.981 | 4.987 | 4.991 | 4.99 |
| | | 4 | | | | 4.988 | 4.986 |
| | | 4.5 | | | | | 4.984 |

| CASE 2: variable CK | | | | |
|---|---|---|---|---|
| | | fsw = 150 kHz | fsw = 200 kHz | fsw = 250 kHz |
| Vin [V] | Iout [A] | Vout [V] | Vout [V] | Vout [V] |
| 9 | 0 | 4.98 | 4.83 | 4.84 |
| 13 | 0 | 4.996 | 4.99 | 4.984 |
| 13 | 4 | 4.98 | 4.89 | 4.9 |

Although the present invention has been described in relation to particular embodiments thereof, many other variations and modifications and other uses will become apparent to those skilled in the art. It is preferred, therefore, that the present invention not be limited by the specific disclosure herein.

What is claimed is:

1. A DC-DC voltage converter comprising:
   a primary side and a secondary side coupled to said primary side, said secondary side including a step-down converter, said step-down converter comprising:

a switching stage including high- and low-side switches connected in series at a switched node across a DC voltage bus;

a control circuit; and a feedback loop connected between an output of the switching stage and an input of the control circuit, the control circuit having a clock signal input and including an error processing circuit coupled to the input for detecting an output of the feedback loop, the control circuit operable to generate PWM modulation and operable to turn OFF the low-side switch and turn ON the high-side switch independent of the output of the switching stage when the clock signal input is detected, wherein in each cycle of PWM modulation the control circuit synchronizes PWM modulation to an external clock source;

wherein said step-down converter is externally synchronizable on said secondary side and operates independently from said primary side.

2. The DC-DC voltage converter of claim 1, wherein the clock signal input is provided from a clock source external to the DC-DC voltage converter.

3. The DC-DC voltage converter of claim 1, wherein the control circuit comprises a flip-flop circuit and a bridge logic circuit, the control circuit connected to gates of the high- and low-side switches, the flip-flop circuit operable to signal the bridge logic circuit to turn OFF the low-side switch and turn ON the high-side switch when the control circuit detects one of falling and rising edges of the clock signal input.

4. The DC-DC voltage converter of claim 1, wherein the feedback loop comprises a shunt regulator and the error processing circuit acts as an error amplifier generating an error signal thereby implementing PWM modulation based on the clock signal input and the error signal.

5. The DC-DC voltage converter of claim 4, wherein the shunt regulator includes first and second compensation circuits and a shunt regulator component connected to a pin providing the error signal to the error processing circuit.

6. The DC-DC voltage converter of claim 1, wherein the error processing circuit comprises:

a capacitor;

a current mirror circuit for charging the capacitor;

a comparator circuit for comparing voltage on the capacitor with the voltage at an ERR feedback pin while the capacitor charges; and a third switch for switching ON and forcing the control circuit to turn ON the low-side switch and to turn OFF the high-side switch, the third switch being triggered to turn ON when the voltage on the capacitor reaches the larger of the voltage at the ERR feedback pin and an internal reference, wherein the third switch stays ON for the duration of time it takes the capacitor to discharge.

7. The DC-DC voltage converter of claim 6, wherein the third switch resets the flip-flop circuit to signal the bridge logic circuit to turn OFF the high-side switch and to turn ON the low-side switch.

8. The DC-DC voltage converter of claim 7, wherein the error processing circuit presents a resistive behavior and a shunt regulator drains a current inversely proportional to an output voltage error from the error processing circuit.

9. The DC-DC voltage converter of claim 1, wherein the error processing circuit comprises an error amplifier outputting an error signal, a current mirror circuit for charging a capacitor using mirrored current, and a comparator circuit for comparing voltage on the capacitor with the error signal while the capacitor charges.

10. The DC-DC voltage converter of claim 1, wherein the control circuit synchronizes PWM modulation using a voltage, the voltage based on an error signal from the error processing circuit; and wherein the control circuit operates to synchronize PWM modulation to the external clock source in each cycle of the PWM modulation by triggering discharge of the voltage in each cycle of the PWM modulation.

* * * * *